(12) United States Patent
Lutz (10) Patent No.: US 6,848,716 B2
(45) Date of Patent: Feb. 1, 2005

(54) STEERING COLUMN WITH A LOCKING DEVICE

(75) Inventor: Christian Lutz, Nüziders (AT)

(73) Assignee: ThyssenKrupp Presta Aktiengesellschaft, Eschen (LI)

( * ) Notice: Subject to any disclaimer, the term of this patent is extended or adjusted under 35 U.S.C. 154(b) by 14 days.

(21) Appl. No.: 10/618,815

(22) Filed: Jul. 14, 2003

(65) Prior Publication Data

US 2004/0012185 A1 Jan. 22, 2004

(30) Foreign Application Priority Data

Jul. 16, 2002 (DE) .......................................... 102 32 041

(51) Int. Cl.⁷ ................................................ B62D 1/18
(52) U.S. Cl. ...................................... 280/775; 74/493
(58) Field of Search ................................ 280/775, 777, 280/779; 74/493

(56) References Cited

U.S. PATENT DOCUMENTS

| 5,606,891 A | | 3/1997 | Tisell et al. | |
| 5,787,759 A | * | 8/1998 | Olgren | .......................... 74/493 |
| 5,988,679 A | | 11/1999 | Schelling et al. | |
| 6,092,957 A | * | 7/2000 | Fevre et al. | .................. 403/373 |
| 6,095,012 A | | 8/2000 | Lutz | |
| 6,450,531 B1 | * | 9/2002 | Rinker et al. | ................ 280/775 |
| 6,623,036 B2 | * | 9/2003 | Yamamura et al. | .......... 280/775 |
| 6,659,504 B2 | * | 12/2003 | Riefe et al. | ................... 280/777 |

FOREIGN PATENT DOCUMENTS

| EP | 0121506 | 10/1984 |
| EP | 0440698 | 9/1991 |

* cited by examiner

Primary Examiner—Paul N. Dickson
Assistant Examiner—Toan C To
(74) Attorney, Agent, or Firm—Sidley Austin Brown & Wood, LLP (57) ABSTRACT

A steering column includes a locking device for securing a jacket tube in a predetermined and adjustment position and having a first locking member with an engagement member received in an at least one hole provided in the first locking member and displaceable between a first position in which it projects beyond the first locking member by a predetermined length, and a second position in which it is displaced into the at least one hole against a biasing force of a spring located in the hole, and a second locking member having a plurality of receiving holes associated with the at least one engaging member and spaced from the first locking member, in opened and closed positions of the locking device, respectively, by a distance which is grater or smaller than the predetermined length by which the engaging member projects in its first position beyond the first locking member.

14 Claims, 7 Drawing Sheets

STEERING COLUMN WITH A LOCKING DEVICE

BACKGROUND OF THE INVENTION

1. Field of the Invention

The present invention relates to a steering column including a jacket tube for receiving at least a section of a steering gear shaft, a bracket member for securing the steering column to a body of a motor vehicle, and a locking device having a closed position in which the jacket tube is fixedly secured to the bracket member, and an open position in which the jacket tube is displaceable, within predetermined limits, relative to the bracket member.

2. Description of the Prior Art

Different embodiments of a steering column, which is described above, are well known. Usually, in the open position of the locking device, both the length of the steering column and its inclination or height can be adjusted. For fixing the jacket tube in the closed position of the locking device, crossing each other, packs of lamellas are provided one of which is secured to the bracket tube and another of which is secured on the bracket member. The lamella packs are pierced by a locking bolt which is tensioned by a pull device. A steering column of the type described above is disclosed, e.g., in European Publication EP 0 802 104 B1. For effecting the necessary adjustment, crossing each other elongate openings are provided in the lamella packs, in the jacket tube, and in the bracket member, with the locking bolt extending through the elongate openings. Locking devices with lamellas or lamella-like elements are discloses, e.g., in European Publications EP 121 506 B1; EP-0 440 698 B1 and U.S. Pat. No. 5,606,891. The drawback of the steering columns, which including locking devices with lamellas, consists in that for obtaining a high retaining force in the closed position of the locking device, a relatively large number of lamellas is required. This results in that for adjusting the steering column in the open position of the locking device, a relatively large friction force has to be overcome.

European Publication EP-0 836 981 B1 discloses an adjustable steering column the locking device of which has toothed members the teeth of which engage each other in the closed position of the locking device. With this locking device, the adjustment of the steering column in the open position of the locking device can be effected rather easily. However, with the locking device of this type, there can be cases when the tips of opposite teeth are located directly opposite each other, and upon closing of the device, it cannot be properly closed. In case of a crash, an uncontrolled displacement of the steering column can take place. Furthermore, in case the tips of the teeth are located directly opposite each other, the device cannot be closed at all or is closed incompletely, and/or requires application of a substantial force for closing.

Accordingly, an object of the present invention is a steering column of the type discussed above and that can be easily adjusted in the open position of the locking device.

Another object of the present invention is a steering column of the type described above and the locking device of which can be easily closed in any of adjustment positions of the steering column.

SUMMARY OF THE INVENTION

These and other objects of the present invention, which will become apparent hereinafter, are achieved by providing a steering column the locking device of which includes a first locking member having at least one hole, an engagement member displaceably received in the at least one hole and displaceable between a first position in which it projects beyond the first locking member by a predetermined length, and a second position in which it is displaced into the at least one hole against a biasing force of a spring located in the hole, and a second locking member having a plurality of receiving holes associated with the at least one engaging member and wherein in the opened and closed positioned of the locking device a distance between the first and second locking members is, respectively, greater and smaller than the predetermined length by which the engaging member projects in its first position beyond the first locking member.

With the inventive locking device, in the closed position of the device, the at least one engaging member of the first locking member engages in an opposite receiving hole of the second locking member corresponding to a selected adjustment position of the locking device. If in the selected adjustment position, no receiving hole is located opposite the engaging member, the pull device can still be closed, as the engaging member is pushed further in its hole in the first locking member, with its free end abutting the surface of the second locking member between the receiving holes. When later, a force is applied to the steering gear shaft of the steering column, whether during a normal operation or in case of a crash, the force would lead to a small displacement of the two locking members relative to each other so that the engaging member would be able to engage in a respective receiving hole of the second locking member as soon as it finds itself opposite the respective receiving hole, whereby a further change of the position of the steering column is prevented.

According to an advantageous embodiment of the present invention, the first locking member includes a plurality of engaging members to each of which a plurality of receiving holes in the second locking members is assigned. Thereby, the length of the path between two adjustment positions of a steering column, in which a respective engagement member engages in a respective hole, can be made very short.

The novel features of the present invention, which are considered as characteristic for the invention, are set forth in the appended claims. The invention itself, however both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

A steering column according to the present invention, which is shown in FIGS. 1–7, has a bracket member 1 which is secured to a section of a vehicle body. The bracket member 1 has two legs 2 projecting downward and between which a jacket tube 3, which has parallel side sections, lies. A section of a steering gear shaft 4 is received in the jacket tube 3 and is rotatably supported therein. A steering wheel is secured on a front end 5 of the steering gear shaft 4. The opposite end of the steering gear shaft 4 is connected with other sections of the steering column (not shown in the drawings) in per se know manner. The sections of the steering column, which are not shown in the drawings, can be formed in a conventional manner and would not be described in detail.

Figure 4:
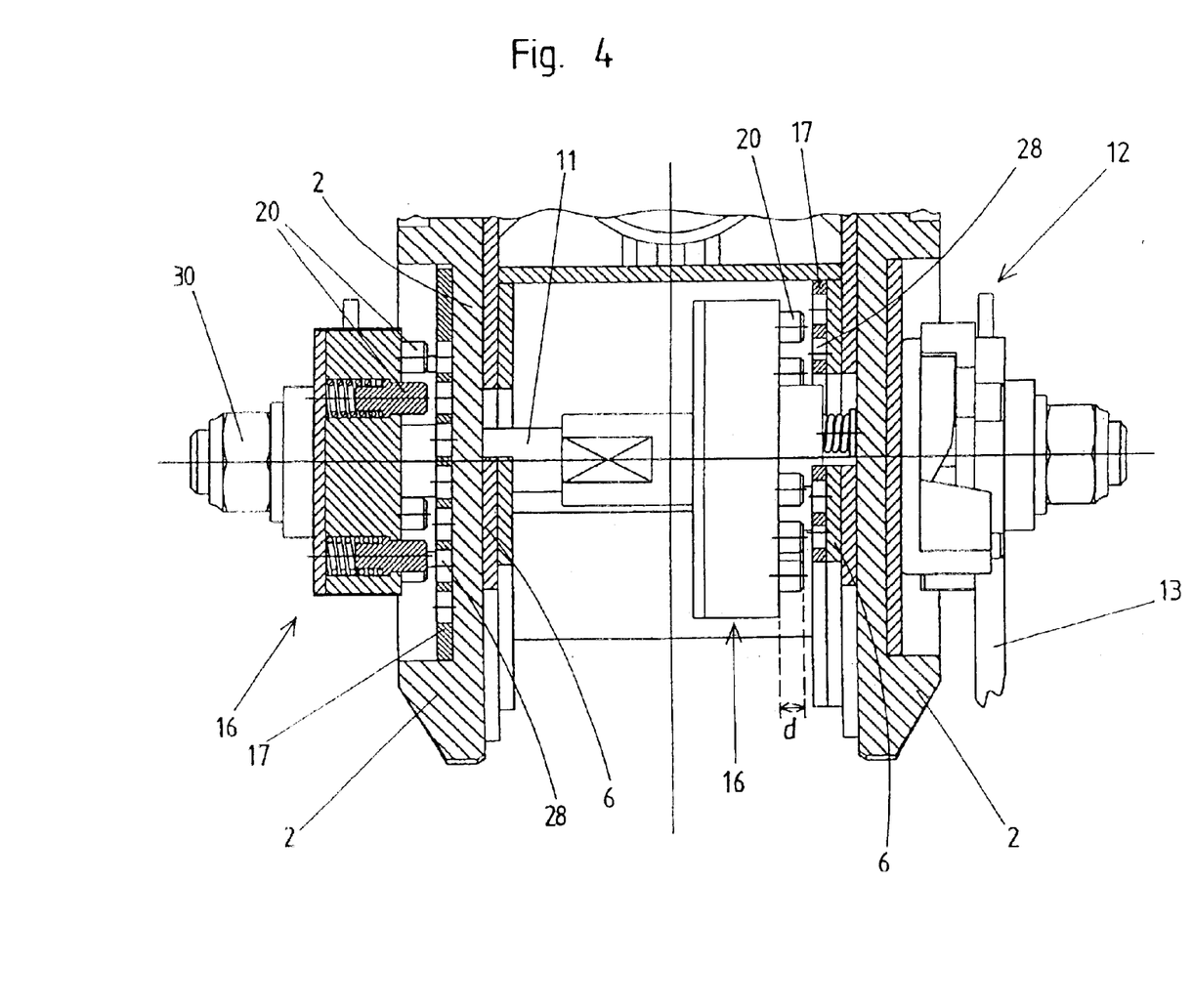
FIG. 4 a cross-sectional view of a portion of the view shown in FIG. 3 at an increased scale.
Figure 5:
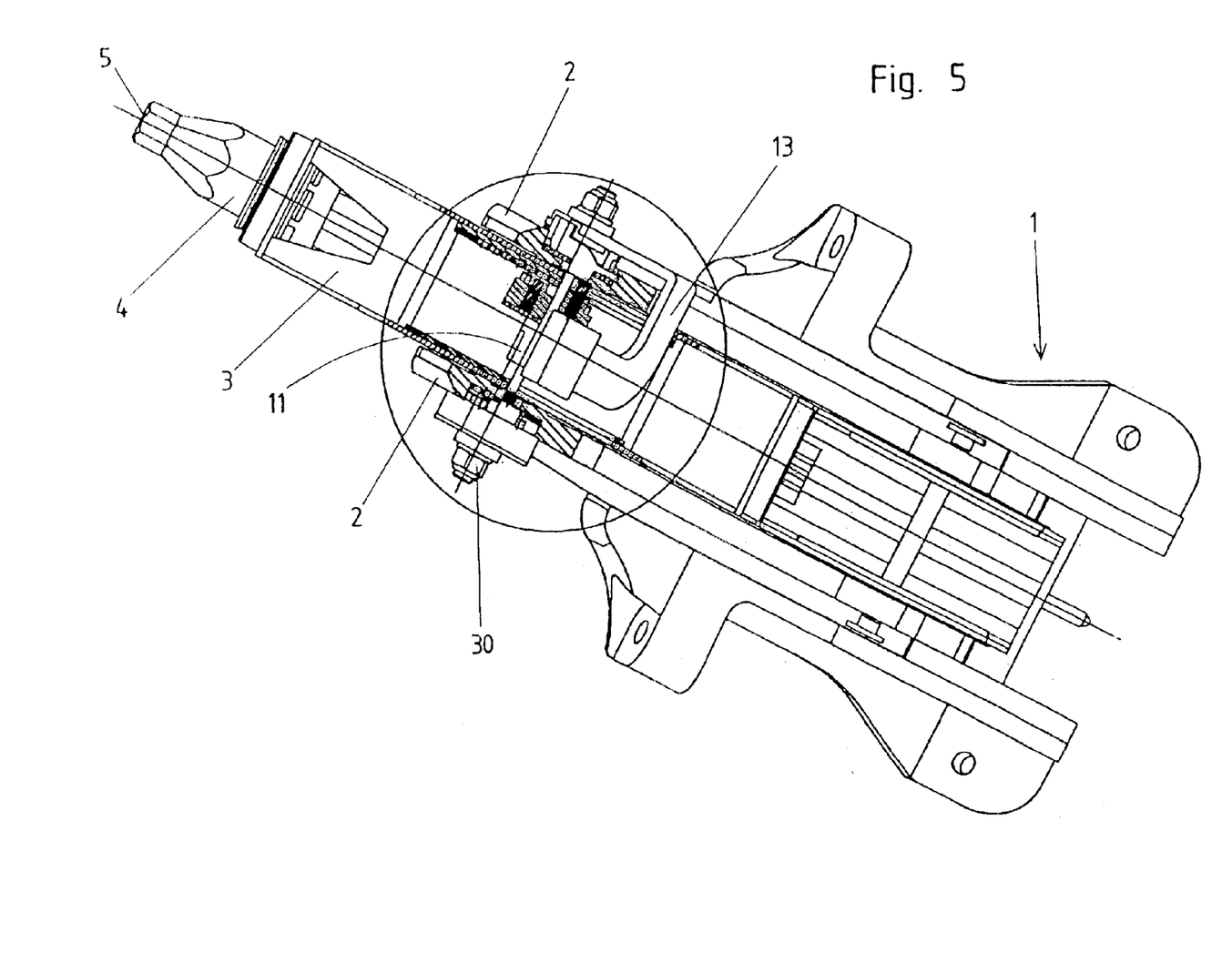
FIG. 5 a bottom partially cross sectional view along line 5—5 in FIG. 2.
Figure 6:
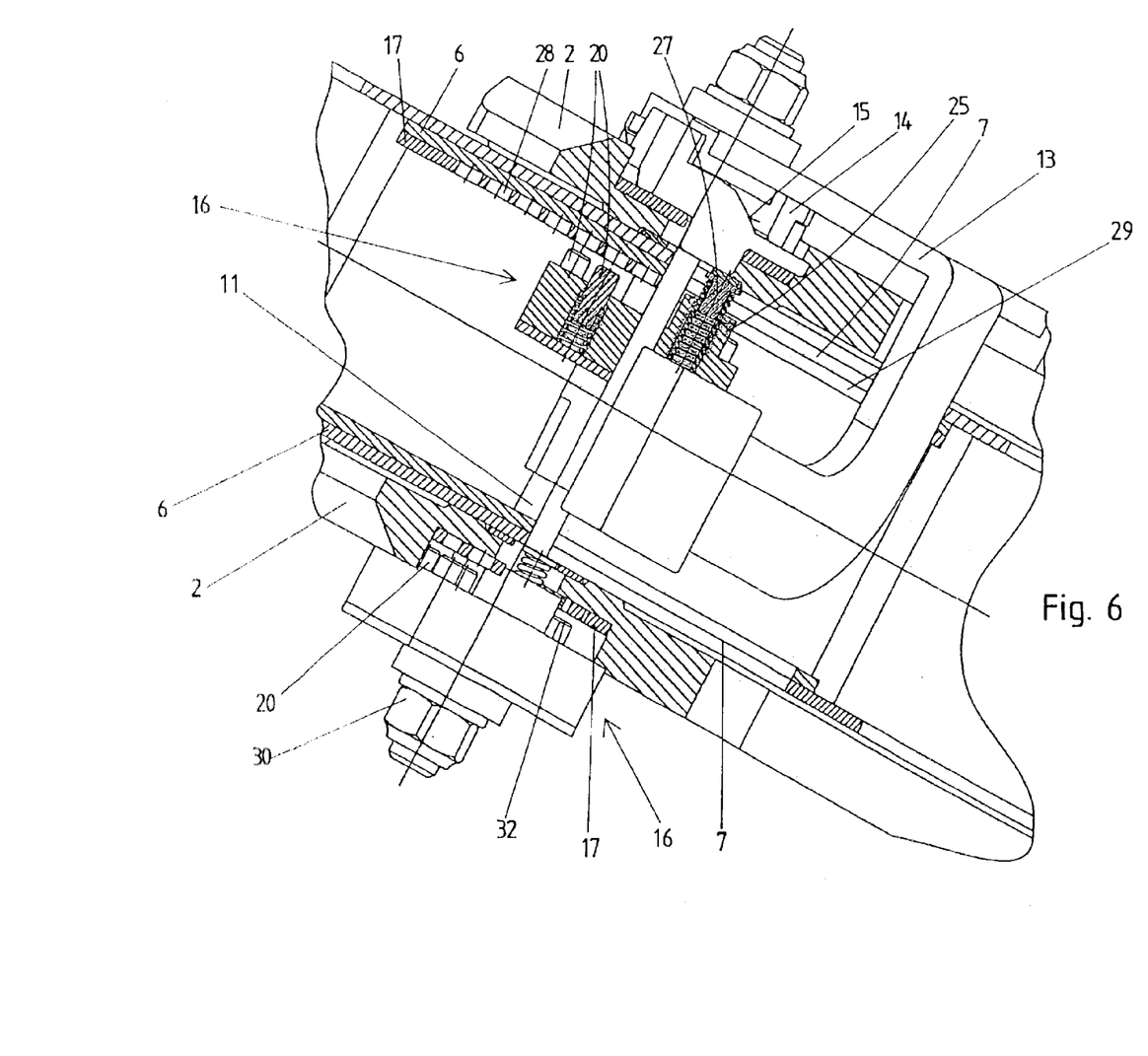
FIG. 6 a view showing a section of the view shown in FIG. 5 at an increased scale.

The jacket tube 3 has two, downwardly projecting cheeks 6 which, e.g., are formed integrally with the jacket tube and, as shown in FIG. 4, are located between the legs 2 of the bracket member 1. The cheeks 6 have elongate openings 7 which extend parallel to the steering gear shaft 4 and at an angle to elongate openings 8 formed in the legs 2. The elongate openings 7 form, with the respective openings 8, an of angle at least 45°. The elongate openings 7 serve for adjusting the steering column in the longitudinal direction of the steering gear shaft 4 which is formed as a telescopic part. The elongate openings 8 serve for an inclination or height adjustment of the steering column. In the embodiment shown in the drawings, the pivot axis of the inclination adjustment is formed by a bolt 9 secured on the bracket member 1 and extending through an elongate opening 10 which is formed in the jacket tube 3 and extends parallel to the elongate openings 7 formed in the cheeks 6 of the jacket tube 3. However, the pivot axis of the inclination adjustment of the steering column could also be formed by a universal joint of the steering gear shaft itself.

A locking bolt 11 extends through the elongate openings 7, 8 which are formed in the jacket tube 8 and/or the bracket member 1. The locking bolt 11 can be displaced to the right (in FIG. 3) with a pull device 12, with the steering column being locked with a locking device. The pull device 12 can include a cam element fixedly connected with a clamping lever 13. The cam element has a plurality of circumferentially arranged cams 14 which cooperate with inclined surfaces 15 of a pressure member. Other pull devices, e.g., those according to the state of the art described in the introductory part of the specification, also can be used.

The locking device of the steering column includes first and second locking members 16, 17 which cooperate with each other in the locking condition of the locking device. As particularly shown in FIGS. 8–9, the first locking member 16 has a body 18 with a plurality of holes 19 an inner diameter of which is reduced at the side facing the second locking member 17, whereby a stop shoulder is formed. Pin-shaped engaging members 20 are inserted into the holes 19 from the side of the holes remote from the second locking member 17. The engaging members 20 have an outwardly projecting annular flange 21. Springs 23 are arranged between the engaging members 20 and a cover plate 22 provided on a side of the body 18 remote from the second locking member and which is screwed to the body 18. In an unloaded condition, the flanges 21 of the engaging members 20 abut the stop shoulders of the respective holes 19 under the action of the springs 23, and the engaging members 20 themselves project beyond the side of the body 18 facing the second locking member 17 by a distance d (FIG. 4). The first locking member 16 also has a through-bore 24 through which the locking bolt 11 extends. Further, the body 18 has, on its side facing the second locking member 17 projections 25 provided with blind bores in which springs 26 are received. The springs 26 are formed as helical springs. Slide elements 27 are inserted into respective springs 26 from an end of the springs 26 remote from the body 18.

Figure 8:
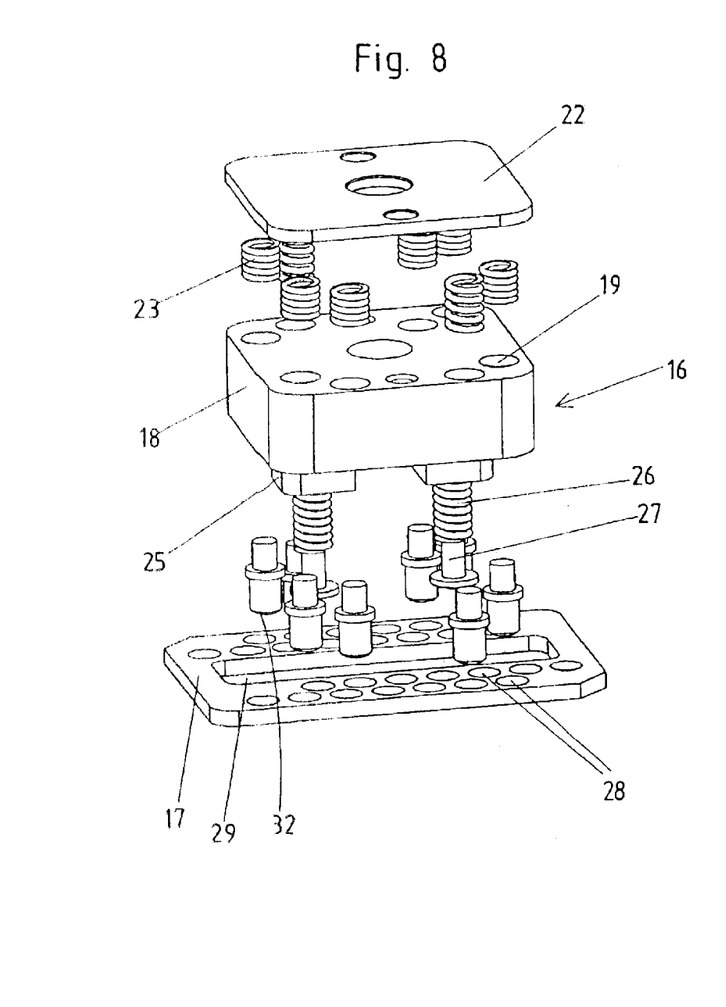
FIG. 8 an exploded view showing first and second locking members.
Figure 9:
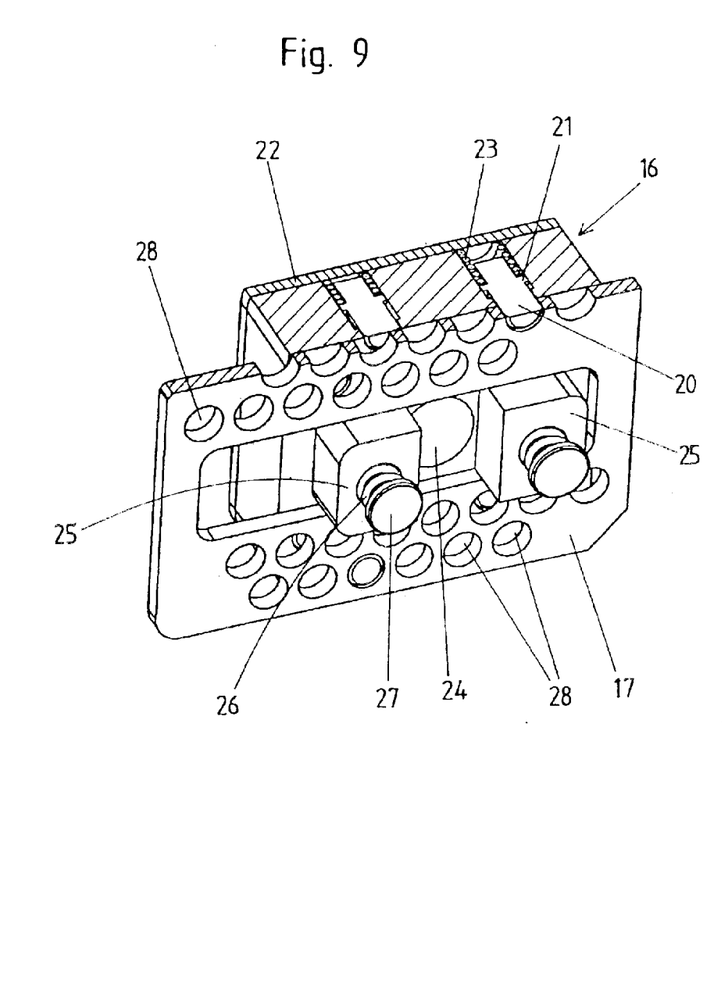
FIG. 9 a partial cross-sectional view showing first and second locking members in the locking position.

The second locking member 17 is plate-shaped and has a plurality of rows of receiving holes 28 and an elongate opening 29, with two rows of the receiving holes 28 being provided on each side of the elongate opening 29. Each row of receiving holes 28 includes a plurality of spaced from each other holes 28 the centers of which lie on an imaginary straight line extending parallel to the longitudinal extent of the elongate opening 29.

The engaging members 20 are associated with a respective row of receiving holes 28. At that, a single receiving hole 28 can be associated with several engaging members 20 and vice versa. During the adjustment of the steering column, with the locking device being in an open position, several receiving holes 28, which are associated with a respective engaging member 20 are brought alternatively in a position opposite the respective engaging member 20. The closing of the locking device is effected in a position of the first locking member 16 in which a respective engaging member 20 is located opposite an associated receiving hole 28, engaging therein in the locking position of the locking device (see FIG. 9 where respective engaging members 20 engage in respective receiving hole 28). In case an engaging element 20 does not have an associated receiving hole 28, it would be pressed into its hole 19 in the body 18 against the biasing force of a respective spring 23.

When the locking device becomes closed in a position of the first locking member 16 in which no receiving hole 28 is located opposite any of the engaging members 20, all of the engaging members 20 are pressed into the body 18. In case a load is applied to the steering column (during a normal operation or in case of al crash) which would cause displacement of the first locking member 16 relative to the second locking member 17, after a very short displacement, a position is reached in which a respective engaging member 20 engages in a respective receiving hole 28. With the embodiment of the locking device shown in FIGS. 8–9, the arrangement of eight engaging members 20 and of four rows of receiving holes 28 are so selected that simultaneously always two engaging members 20 engage in respective receiving holes 28.

For a steering column shown in FIGS. 1–7, the first and second locking members 16, 17 are used for both longitudinal adjustment and inclination adjustment. The first locking member 16 is secured, for setting the height position of the steering column, on the locking bolt 11 on an outer side of the leg 2 remote from the pull device 12. The locking member 16 is secured with a nut 30 which is screwed on the locking bolt 11. The second member 17 is secured to the outer side of the leg 2 so that the elongate opening 29, which is formed in the locking member 17, overlaps with the elongate opening 8 formed in the leg 2. Basically, the second locking member 17 can be formed integrally with the leg 2 as part of the bracket member 1. In this case, the elongate openings 29 and 8 coincide.

FIGS. 1 through 6 show an open position of the locking device. In this position of the locking device, the ends of the engaging members 20, which project beyond the first locking member 16 are spaced from the second locking member 17. The projections 25 extend through the elongate opening 29 in the second locking member 17 and/or through the elongate opening 8 in the leg 2, whereby rotation of the first locking member 16 relative to the second locking member 17 is prevented. The springs 26, together with the slide elements 27 likewise extend through the elongate opening 29 and/or the elongate opening 8 and are supported against the outer side of the jacket tube 3, which provides for spacing of the first locking member 16 from the second locking member 17.

Figure 1:
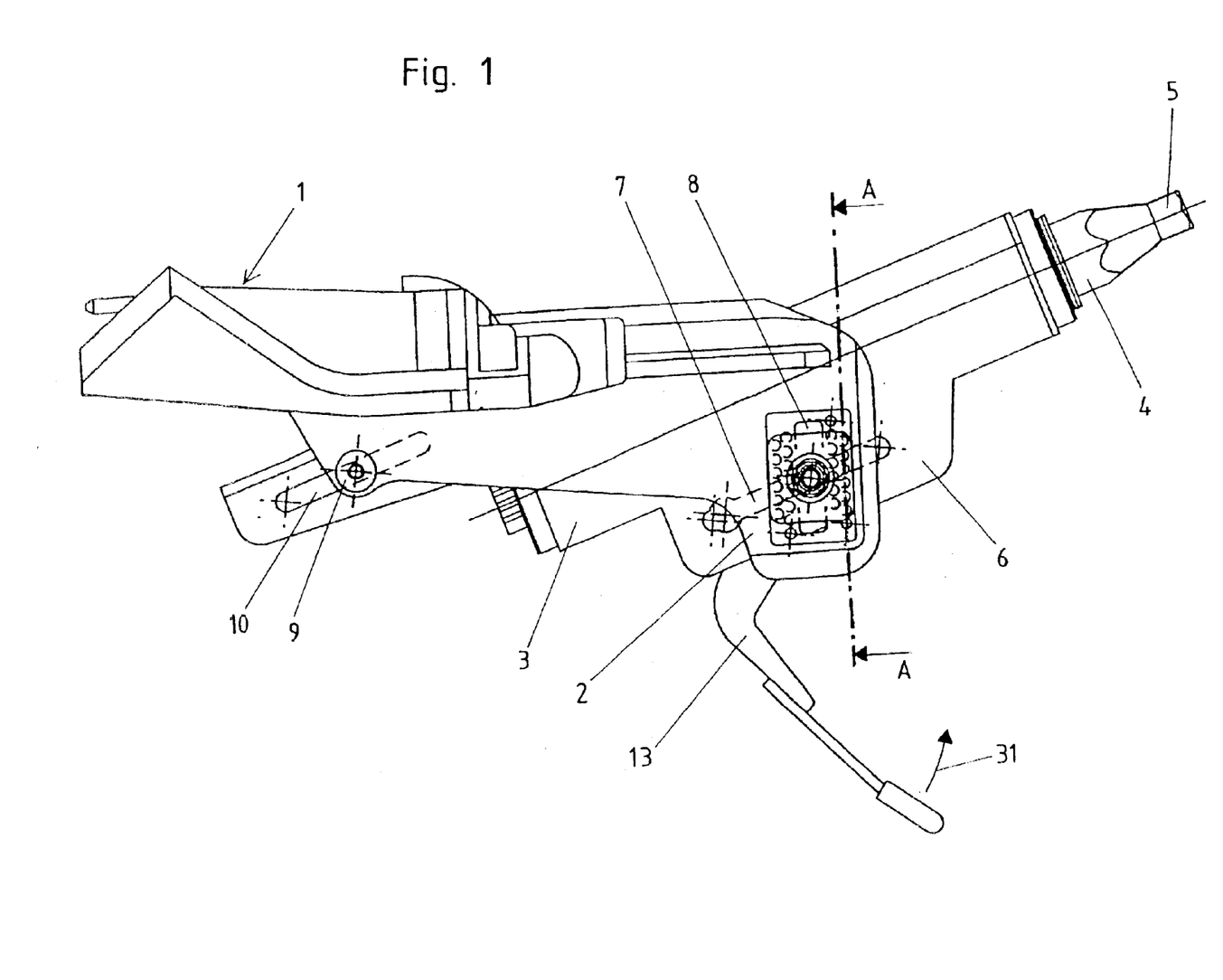
FIG. 1 a side view of a section of a steering column according to the present invention illustrating the inventive parts of the column.
Figure 2:
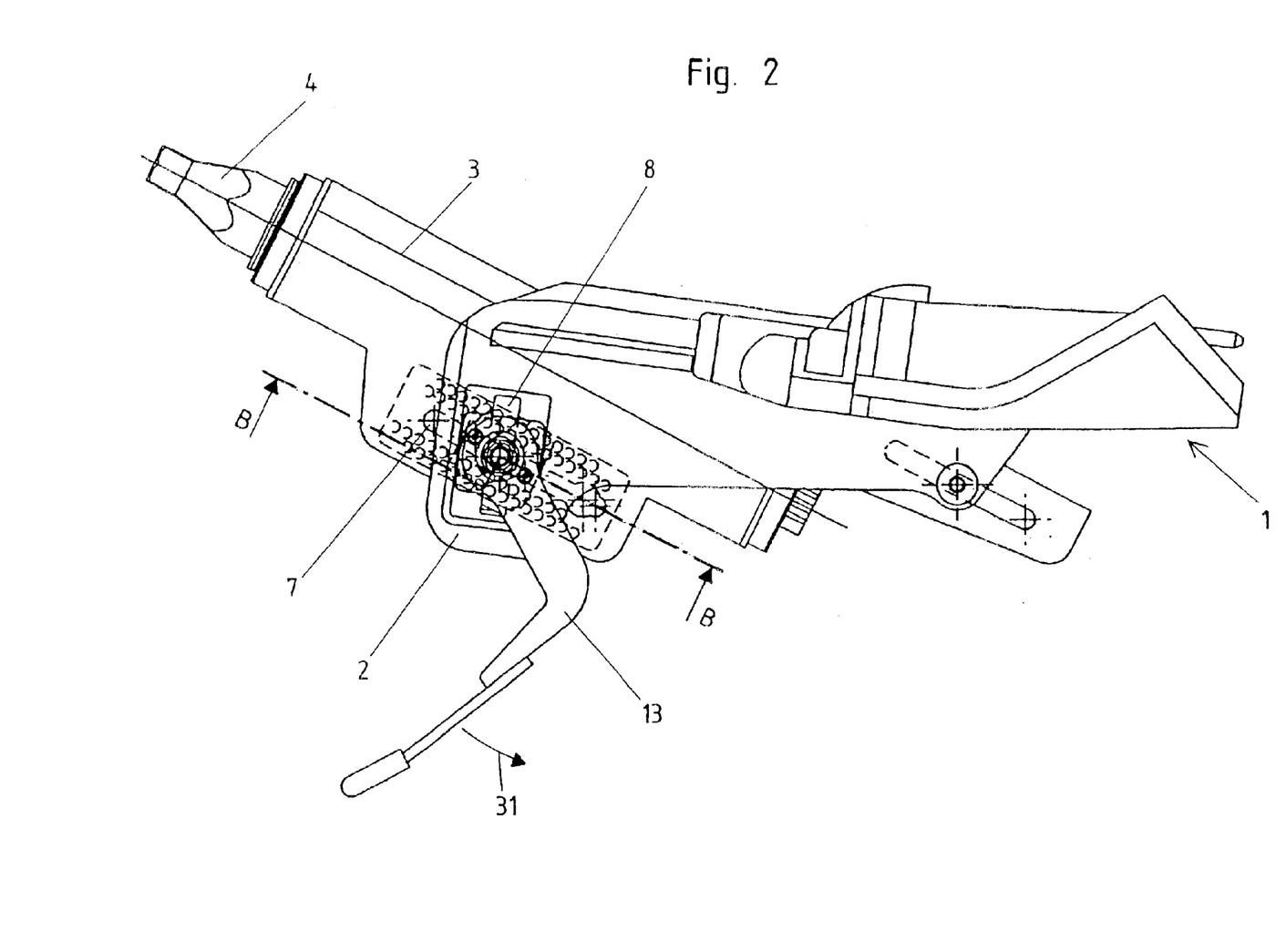
FIG. 2 a side view of another side of the inventive steering column.
Figure 3:
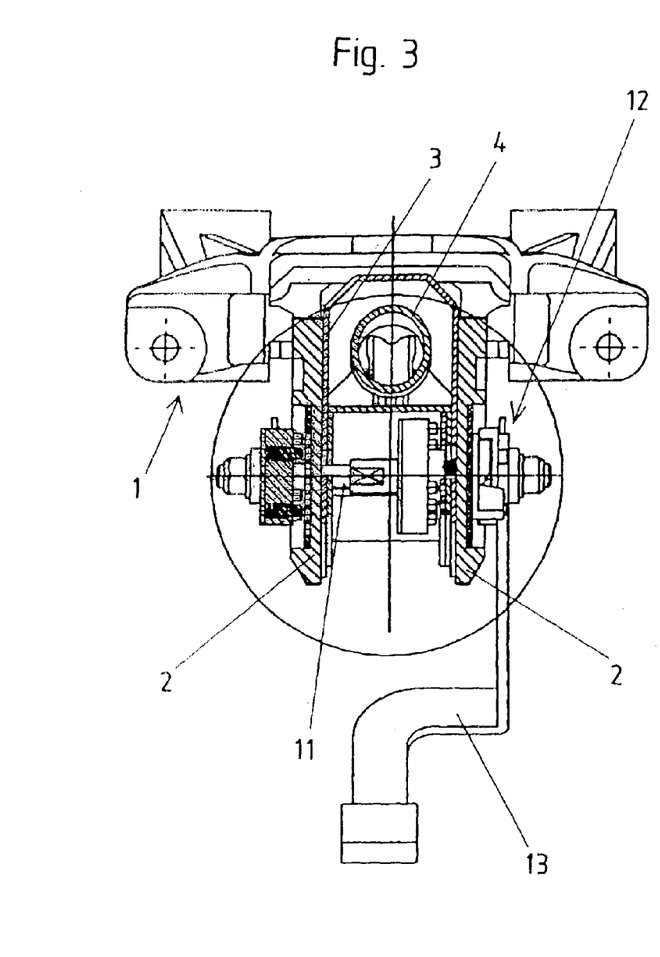
FIG. 3 a cross-sectional view along line 3—3 in FIG. 1.

Similarly, for setting the height of the steering column, a first locking member 16 of another locking device is secured on the locking bolt 11 in the region between the cheeks 6 of the jacket tube 3. This first locking member 16 is supported against a shoulder of the locking bolt 11, which prevents its displacement leftwardly (FIG. 3). The second locking member 17 of the another locking device is secured to the inner side of the cheek 6 of the jacket tube 3 which is located on the right in FIGS. 3–4. The elongate opening 29 of the second locking member 17 of the another locking device and through the elongate opening 7 in the cheek 6, with the slide elements 27 being supported against the leg 2.

Figure 7:
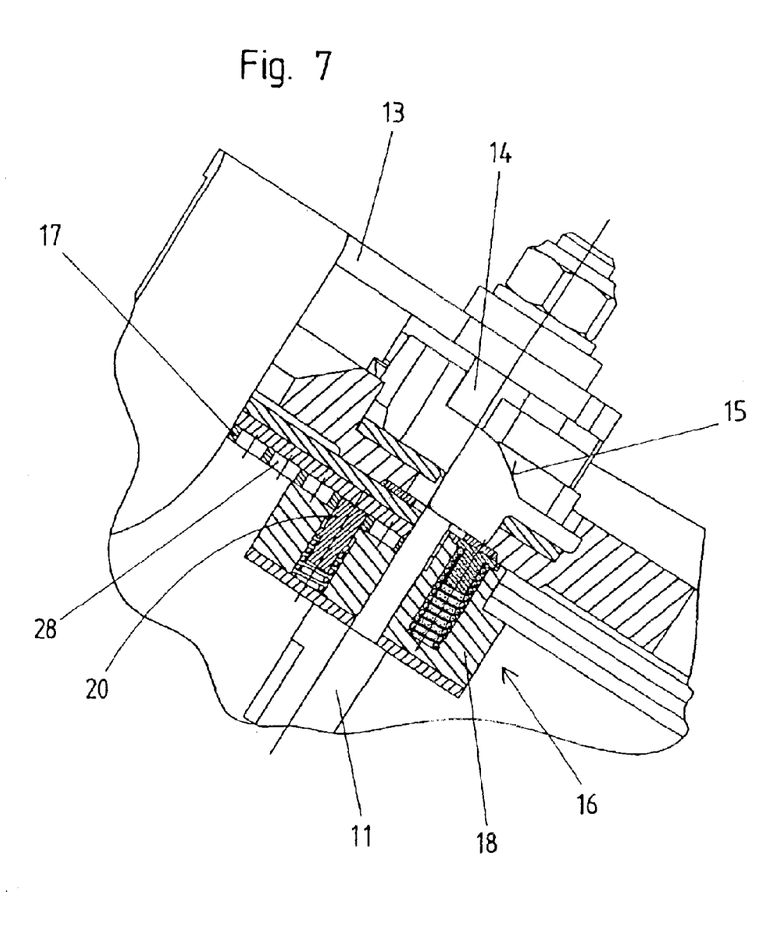
FIG. 7 a view showing a section of a steering column shown in FIG. 6 in a closed position of the locking device.

When from an open position of the locking device shown in FIGS. 1–6, the clamping lever 13 is pivoted in the direction of arrow 31 (FIG. 1), the first locking member is pulled, in views shown in FIGS. 3–4, to the right toward the second locking member 17. The locking position of the locking members 16 and 17, for the case of the longitudinal adjustment, is shown in FIG. 7 in which an engaging member 20 engages in a receiving opening 28.

In the embodiment shown in the drawings, in the closed position of the locking device, the first and second locking members 16 and 17 are pressed against each other, whereby the two locking members become frictionally connected with each other in addition to a formlocking connection that results from engagement of the engaging member(s) 20 in the receiving hole(s) 28. The frictional connection is amplified by the pressure applied by the engaging members 20, which do not engage in the receiving holes (28) against the outer surface of the second locking member 17.

Though frictional engagement of the first and second locking members 16 and 17 in the closed position of the locking device is preferred, it is also contemplated and possible that the first locking member 16 would not be pressed against the second locking member 17 in the closed position of the locking device. Rather, the first locking member 16, in the later case, would be spaced from the second locking member 17 by a small distance smaller than the portion d by which the engaging member 20 projects beyond the first locking member 16. In this case, in the closed position of the locking device, only a reduced frictional connection is obtained, which results from pressure applied by the engaging members 20, which are not engaged in the holes 28, to the surface of the second locking member 17. The fixed connection of the first second member 16 with the second locking member 17 is insured by the formlocking connection formed as a result of engagement of the engaging member(s) 20 in the receiving hole(s) 28.

In order to facilitate the engagement of the engaging members 20 in the receiving holes 28, advantageously, the engaging members 20 are provided, in the region of the free end, with bevels 32 (FIG. 8). Generally, the engaging members 20 can have different profiles. However, advantageously, the engaging members 20 are formed as pin-shaped members. The receiving holes 28 can have a cross-sectional profile different from al circular profile shown in the drawings, e.g., they can have a rectangular profile. To compensate for the manufacturing tolerances, a corresponding play can be provided between the engaging members 16 and the receiving holes 28. In order to facilitate the engagement of the engaging members 20 in the receiving holes 28 upon displacement of the first locking member 16 relative to the second locking member 17m, e.g., in the case of a crash, a greater play can be provided between the diameters of the engaging member 20 and the receiving hole 28 in the displacement direction than in a direction perpendicular to the displacement direction.

It is to be pointed out that different modification of the present invention are contemplated and possible within the scope of the present invention. Thus, the bracket member and the steering column can have a construction different from that shown in the drawings. The possible constructions can be those disclosed in the stand of the art discussed in the introductory part of the specification, e.g., in addition to the bracket member and a jacket tube, a guide member can be provided relative to which the jacket tube can be displaced in the longitudinal direction of the steering gear shaft and which would support the locking bolt for displacement in the axial direction. The guide member can be arranged between the bracket member and the jacket tube. With such a construction, a locking bolt can be provided that would not completely extent through the jacket tube as in the embodiment shown in the drawings but would only project into the jacket tube.

Accordingly, though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the append claims.

What is claimed is:

1. A steering column comprising:

a steering gear shaft;

a jacket tube for receiving at least section of the steering gear shaft;

a locking device having a closed position in which the jacket tube is fixedly secured to a bracket member, and an open position in which the jacket tube is displaceable, within predetermined limits, relative to the bracket member; and a pull device for opening and closing the locking device, wherein the locking device has a first locking member having at least one hole, an engagement member displaceably received in the at least one hole and displaceable between a first position in which it projects beyond the first locking member by a predetermined length, and a second position in which it is displaced into the at least one hole against a biasing force of a spring located in the hole, and a second locking member having a plurality of receiving holes associated with the at least one engaging member, and wherein in the open and closed positions of the locking device, a distance between the first and second locking members is, respectively, greater and smaller than the predetermined length by which the engaging member projects, in the first position thereof, beyond the first locking member.

2. A steering column as set forth in claim 1, wherein the first and second locking members are pressed against each other in the closed position of the locking device.

3. A steering column as set forth in claim 1, wherein the first locking member has at least two engaging members, and the second locking member has receiving holes associated with each of the at least two engaging members.

4. A steering column as set forth in claim 1, further comprising a locking bolt that extends through at least one opening in the bracket member and at least one opening in the jacket tube, and that cooperates with the pull device.

5. A steering column as set forth in claim 4, wherein at least one of the at least one opening of the bracket member and the at least one opening of the jacket tube is formed as an elongate opening.

6. A steering column as set forth in claim 5, wherein the receiving holes of the second locking members are arranged in a row one after another and have centers thereof located on al straight line extending parallel to a longitudinal extent of the elongate opening.

7. A steering column as set forth in claim 6, wherein the second locking member has at least two rows of receiving holes associated with the at least one engaging member and located, respectively, on opposite sides of the elongate opening.

8. A steering column as set forth in claim 7, wherein the second locking member has at least two rows of receiving holes located on each side of the elongate opening.

9. The steering column as set forth in claim 1, further comprising at least one spring for retaining the first and second locking members in a spaced relationship to each other in the open position of the locking device.

10. The steering column as set forth in claim 9, wherein the first locking member has at least one projection projecting into an elongate opening formed in the second locking member, and wherein the at least one retaining spring is arranged in the at least one projection.

11. A steering column as set forth in claim 1, wherein the at least one engaging member has a bevel at a free end thereof.

12. A steering column as set forth in claim 1, wherein the first locking member has a body and the at least one hole is provided in the body, and wherein the locking device further comprises a cover plate located on a side of the body remote from the second locking member for closing the at least one hole.

13. A steering column as set forth in claim 12, wherein the at least one hole has, in a region adjacent to the second locking member, a section with a smaller diameter and forming a stop shoulder, and wherein the at least one engaging member has an annular flange cooperating with the stop shoulder for retaining the at least one engaging member in the at least one hole.

14. A locking device for a steering column having a jacket tube for receiving at a least a section of a steering gear shaft, and a bracket member for securing the steering column to a body of a motor vehicle, the locking device having a closed position in which the jacket tube is fixedly secured to the bracket member, and an open position in which the jacket tube is displaceable, within predetermined limits, relative to the bracket member, the locking device comprising:

a first locking member having at least one hole and an engagement member displaceably received in the at least one hole and displaceable between a first position in which it projects beyond the first locking member by a predetermined length, and a second position in which it is displaced into the at least one hole against a biasing force of a spring located in the hole; and a second locking member having a plurality of receiving holes associated with the at least one engaging member, wherein in the open and closed positions of the locking device, a distance between the first and second locking members is, respectively, greater and smaller than the predetermined length by which the engaging member projects in the first position thereof beyond the first locking member.

* * * * *